Patented Oct. 3, 1933

1,929,085

UNITED STATES PATENT OFFICE 1,929,085

METHOD OF PRESERVING VIABLE BACILLI

Erwin A. A. Suehs, Yonkers, N. Y.

No Drawing. Application December 1, 1932
Serial No. 645,239

5 Claims. (Cl. 99—11)

My invention relates to a novel method of treating or handling viable bacilli or bacteria of the aciduric group, such, for example, as Bacillus acidophilus and Bacillus bulgaricus.

Viable bacilli or bacteria of the aciduric group, particularly Bacillus acidophilus and Bacillus bulgaricus, are widely used for corrective action in the human intestines and generally are incorporated in milk for introduction into the system. However, their normal life span is relatively short, and so far as I am aware, all prior attempts to preserve their viability have proved to be entirely unsuccessful. Consequently, according to present practice, they must be supplied to and be used by patients soon after their propagation, which is quite disadvantageous and results in high costs due primarily to unavoidable waste.

Accordingly, my object is to provide a novel method of treating or handling bacilli or bacteria of the aciduric group whereby their viability may be preserved substantially indefinitely.

It has been generally supposed heretofore that maintaining bacilli or bacteria of the group mentioned in a cold or frozen state would preserve their viability, but I have ascertained that regardless of low temperature conditions the bacilli or bacteria soon die if they are permitted to remain in or to be subjected to the influence of their propagating medium. On the other hand, I have discovered that if the bacilli or bacteria first are separated from their culture medium and then are frozen, and are maintained frozen, or are maintained at a temperature sufficiently low to render them dormant, they remain viable substantially indefinitely. Accordingly, my invention in its broader aspects contemplates the separation, in any suitable manner, of bacilli or bacteria of the aciduric group from their culture medium and maintaining the separated bacilli or bacteria in a very cold or frozen state in any suitable manner, either in some other medium such, for example, as water ice, or apart therefrom. On the other hand, in its narrower aspects, my invention contemplates incorporating the separated bacilli or bacteria in food products such, for example, as ice cream, custards, yeast, the candy coatings of ice cream blocks, and other products to be eaten in a very cold or frozen condition, and utilizing the cold of such products to maintain the bacilli or bacteria dormant and viable.

I have found that after separation of the bacilli or bacteria from their propagating medium, subjecting them to a temperature sufficiently low to freeze them, and maintaining them at this temperature, serves to preserve their viability substantially indefinitely, and I have found, also, that they apparently become frozen and remain dormant and viable at the freezing temperature of water. Moreover, I have found that their viability apparently is in no way affected by subjecting them to and maintaining them at considerably lower temperatures.

For the sake of explaining my invention, I shall describe a procedure for incorporating Bacillus acidophilus in ice cream.

The bacilli are grown in a big tank in a suitable protein medium, such as broth, milk and the like. By centrifuging, filtering, washing, or otherwise, the bacilli are removed from their culture medium or inhibitory fluids. This mass of viable bacilli is a putty-like paste, which is added to any food product adapted to be impregnated with these bacilli. For example, to add the bacilli to ice cream, the concentrated mass of viable bacilli is diluted with the milk to be used in the ice cream mixture. I should say that for one quart of ice cream about two or three grams of bacillus paste may be used, but I do not limit myself to any particular proportion of those ingredients. More broadly speaking, I might say that the paste is diluted according to therapeutic doses defined by recognized authorities. The concentrated mass of bacilli may be used as a wet paste for diluting with milk or water, or it may be dried before diluting. In either case, the bacilli are in viable form and are uniformly distributed in the ice cream mixture before and after the freezing operation. After the bacilli have been diluted with the milk, the ice cream is made in the usual way. The viable bacilli remain dormant in the ice cream or other frozen confection, and when taken internally they are activated by the heat of the body to perform their intended function.

The above process is also applicable in impregnating other food products (for example, yeast) with viable therapeutic bacilli. Instead of distributing the bacilli throughout the entire edible mass, they may be confined to the outer coating in such products as eskimo pie, which has an ice cream center enrobed in a layer of frozen chocolate. Before the chocolate coating is applied, the bacilli are introduced while the chocolate is still liquid but not too hot. By stirring a suitable amount of bacillus paste (moist or dry) into the chocolate kettle, the viable bacilli become distributed uniformly throughout the mixture. The subsequent freezing of the chocolate coating preserves the bacilli in viable state. In some cases the bacillus paste may be diluted with water, or any other suitable liquid, depending upon the ingredients used in making this or that frozen confection. The presence of the bacilli does not alter the taste, smell, appearance and keeping qualities of the impregnated food product, and the bacilli may be used with any flavor.

Although I have described a specific method of procedure, my invention is not limited to the details set forth, nor to any particular kind of frozen product or freezing agent for the bacilli. The *Bacillus acidophilus* is the most widely used for corrective action in the human intestines, and so I prefer that bacillus for impregnating the desired food products. However, other bacilli having therapeutic value may be used, such as *Bacillus bulgaricus*, which, like *Bacillus acidophilus*, belongs to the aciduric group.

This application is in part a continuation of my application filed May 30, 1930, Serial Number 455,464.

I claim as my invention:

1. The method of preserving viable bacteria of the aciduric group, which comprises substantially freeing them from the liquid medium in which they were grown, adding them to a food product, and then freezing said product and maintaining the same frozen.

2. The method of preserving viable *Bacillus acidophilus* which comprises freeing the bacillus from the liquid medium in which it was grown, adding it to a food product, and then freezing said product and maintaining the same frozen.

3. The method of preserving viable *Bacillus bulgaricus* which comprises freeing the bacillus from the liquid medium in which it was grown, adding it to a food product, and then freezing said product and maintaining the same frozen.

4. The method of treating bacilli or bacteria of the aciduric group to preserve their viability, which comprises first separating them from their culture medium and then subjecting them to and maintaining them at a freezing temperature.

5. The method of treating bacilli or bacteria of the aciduric group to preserve their viability, which comprises first separating them from their culture medium, then incorporating them in another medium, and then freezing the latter medium and maintaining it frozen.

ERWIN A. A. SUEHS.